Dec. 21, 1965 L. BALAMUTH 3,224,086
METHOD OF HIGH FREQUENCY VIBRATION FITTING
Filed Nov. 13, 1961 3 Sheets-Sheet 1

INVENTOR
LEWIS BALAMUTH
BY
ATTORNEY

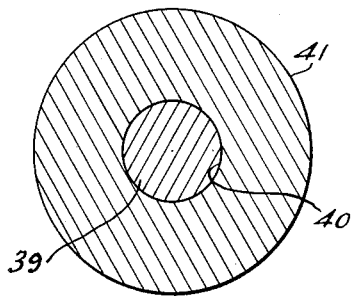
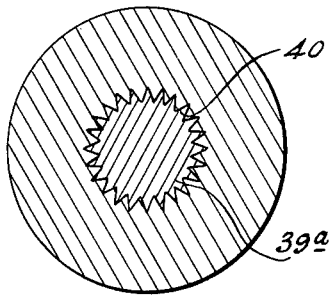
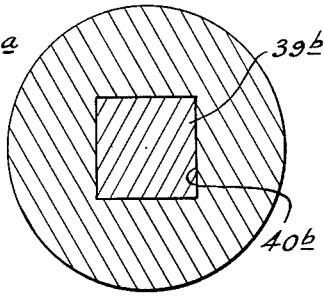
*Fig. 3.*  *Fig. 4.*  *Fig. 5.*
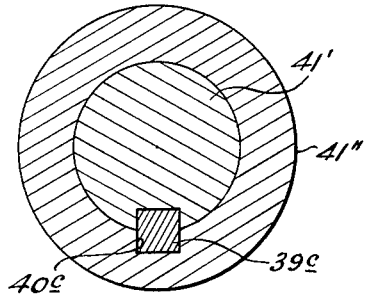
*Fig. 6.*
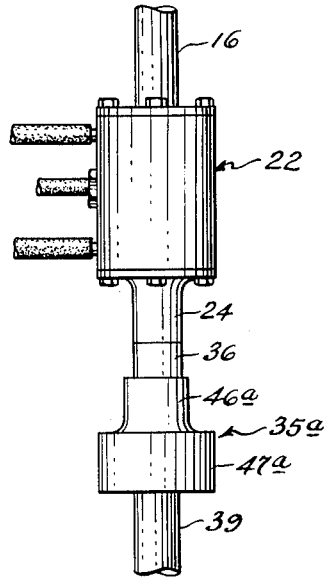
*Fig. 7.*
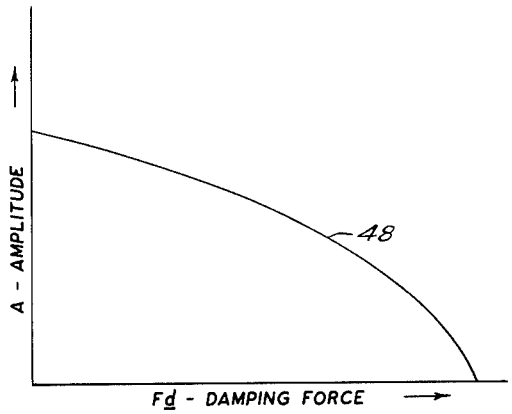
*Fig. 8.*
INVENTOR
LEWIS BALAMUTH
BY
ATTORNEY Dec. 21, 1965     L. BALAMUTH     3,224,086
METHOD OF HIGH FREQUENCY VIBRATION FITTING
Filed Nov. 13, 1961     3 Sheets-Sheet 3

INVENTOR
LEWIS BALAMUTH

United States Patent Office 3,224,086
Patented Dec. 21, 1965

3,224,086
METHOD OF HIGH FREQUENCY VIBRATION FITTING
Lewis Balamuth, New York, N.Y., assignor to Cavitron Ultrasonics Inc., New York, N.Y., a corporation of New York
Filed Nov. 13, 1961, Ser. No. 151,932
4 Claims. (Cl. 29—525)

This invention relates generally to the fitting together of two members, for example, the fitting of a rod, pin, shaft, wire or bar into a corresponding recess, socket, bore or other opening defined by at least one other member which is to be assembled therewith, and more particularly is directed to the vibration fitting together of two or more members by the use of compressional wave energy.

It is frequently necessary, in the manufacturing industries, to fit or insert one member, such as, a rod, pin, shaft, wire or bar into a corresponding recess, socket or bore defined by another member or members, with a specified class of fit therebetween. In ordinary machine construction, five classes of fits are commonly used: namely, running fit, push fit, driving fit, forced fit, and shrinkage fit. A running fit, as the name implies, is employed when the assembled together parts or members are to freely rotate relative to each other; a push fit permits relative movement of the assembled together parts or members, but does not provide sufficient clearance between the assembled members to permit free relative rotation; and the remaining classes of fits referred to above are used in assembling together parts or members which must be held in fixed positions relative to each other. The force that must be exerted to insert one member, such as, a rod, pin or shaft, into a corresponding socket, recess or bore of another member depends upon the class of fit to be provided between the assembled together members, and the magnitude of such force may be very substantial, particularly in the case of driving, forced or shrinkage fits. Further, even where a loose or running fit is provided, the resistance to buckling of the member being inserted by an axially applied force may not be sufficient to withstand the force necessary to overcome the frictional resistance to insertion. For example, the frictional resistance to insertion of a long wire or cable into a tube or conduit may be greater than the resistance to buckling of the wire or cable.

Accordingly, it is an object of this invention to provide methods by which one member, such as, a rod, pin, shaft, wire or bar, may be inserted in a corresponding recess, socket or bore defined by at least another member with a desired class of fit therebetween, through the exertion of a relatively moderate pressure or static force in the direction of insertion, as compared with the force or pressure that would otherwise be required to effect the insertion with that desired class of fit.

In accordance with an aspect of the invention, at least one of the members to be fitted together is elastically vibrated at a high frequency in a manner to effect alteration of the cross-sectional dimensions of the vibrated member during each vibrating cycle, thereby to cyclically increase the clearance between the members, or to reduce the interference between their contacting surfaces, so as to permit the insertion of one member into the other through the exertion of a relatively reduced or moderate static force. The elastic vibration of at least one of the members to be fitted together further ensures that the surfaces of the members are always in a state of relative motion, so that the frictional resistance therebetween is based on the kinetic frictional coefficient therebetween, rather than on the relatively higher static frictional coefficient.

In accordance with another aspect of the invention, the vibrations are applied to the member which is to be inserted in the other member in the direction of such insertion, and the high frequency and amplitude of the vibrations are selected so as to achieve large peak accelerations, for example, accelerations of the order of at least 1000 G, "G" being the symbol representing gravitational acceleration, whereby a relatively small static force applied to the vibrated member in the direction for inserting the latter in the other member produces relatively large dynamic forces between the two members tending to effect the desired insertion, and cooperating with the above mentioned cyclical alteration of the cross-sectional dimensions of the vibrated member, and with the reduced frictional resistance, to further facilitate the fitting together of the two members.

The above, and other objects, features and advantages of the invention, will be apparent in the following detailed description of illustrative embodiments thereof which is to be read in connection with the accompanying drawings forming a part hereof, and wherein:

FIG. 3 is a sectional view taken along the line 3—3 on FIG. 2, but on a reduced scale;

FIGS. 4, 5 and 6 are sectional views similar to that of FIG. 3, but showing various other shapes of members that may be fitted together with the apparatus of FIG. 1;

FIG. 7 is a fragmentary view similar to a portion of FIG. 1, but showing a modification of the acoustic impedance transformer included therein;

FIG. 8 is a graph showing the relationship between the amplitude of the vibrations produced in one of the members to be fitted together and the static force required to damp such vibrations;

Figures 1, 2:
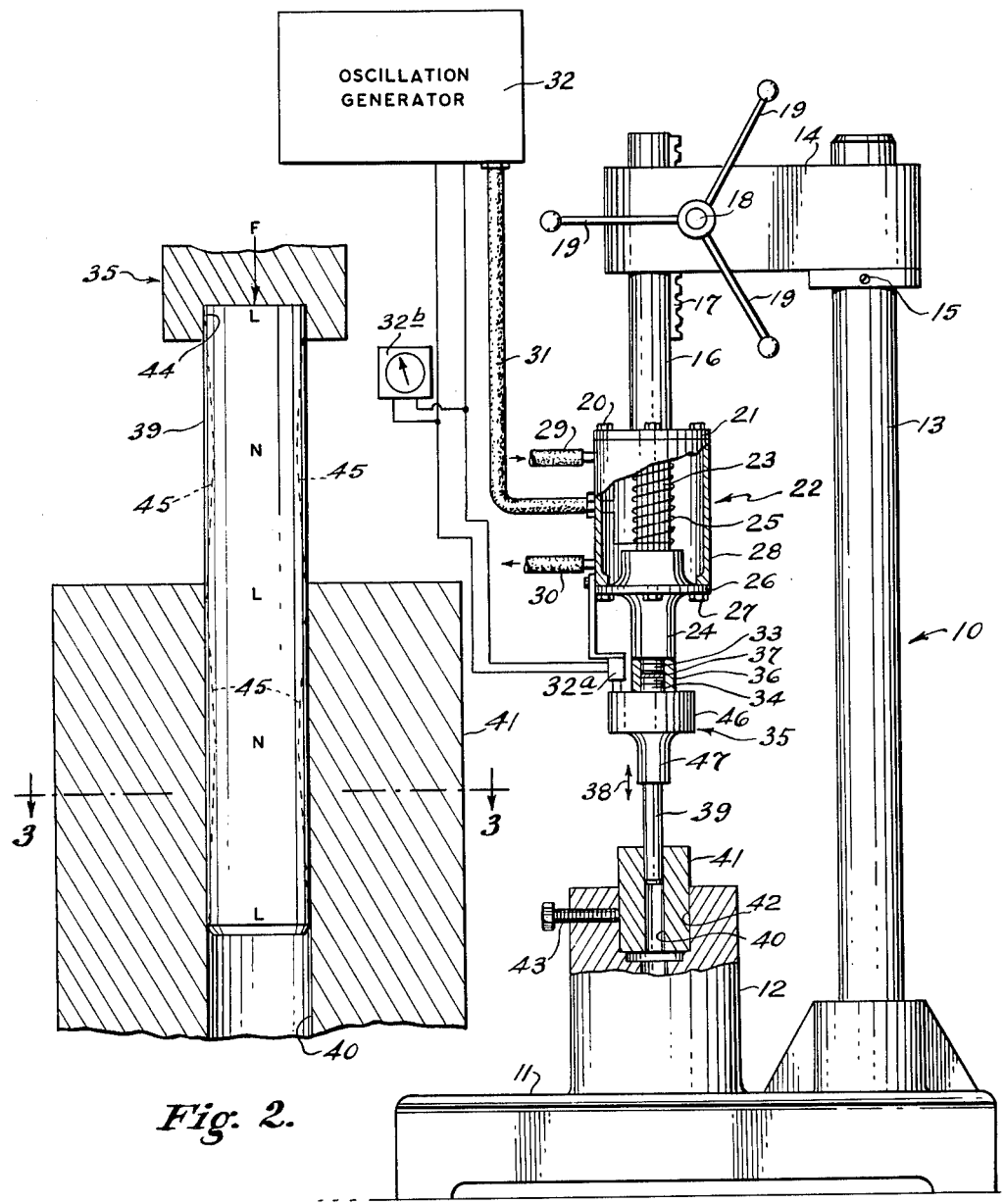
FIG. 1 is an elevational view, partly broken away and in section, of an apparatus for inserting one member into an opening of corresponding cross-section defined by another member in accordance with the invention, and with electrical components of the apparatus being diagrammatically illustrated.
FIG. 2 is an enlarged sectional view illustrating the manner in which the apparatus of FIG. 1 operates to produce elastic vibrations of one of the members for facilitating the insertion thereof in the opening of the other member.

Referring to the drawings in detail, and initially to FIG. 1 thereof, it will be seen that an apparatus 10 for assembling together two or more members which are respectively dimensioned so as to have a desired class of fit therebetween may include a stand having a base 11 supporting a chuck or mounting fixture 12 of any suitable type for holding one of the members which are to be fitted together. A post 13 extends upwardly from base 11 in back of mounting fixture 12 and a head 14 is slidable on post 13 and adjustably secured at any desired location along the latter by means of a set screw 15. Head 14 extends radially forward from post 13 to overlie the chuck or mounting fixture 12 on base 11, and the free end portion of head 14 is provided with a vertical bore extending therethrough and slidably receiving a tool supporting rod 16.

In order to effect vertical movement of the tool supporting rod 16, the latter may be provided with a gear rack 17 extending therealong and in meshing engagement with a pinion (not shown) which is disposed in a suitable recess of head 14 and fixed on a laterally extending shaft 18 journalled in head 14 and having handles 19 secured to one end to permit manual rotation of shaft 18.

Suitably secured to the lower end of rod 16, for example, by screws 20 extending through a radial flange 21 which is welded or otherwise rigidly joined to rod 16, is a vertically disposed, water-cooled magnetostriction transducer 22, which is preferably of the type disclosed in United States Letters Patent No. Re. 25,033, issued August 29, 1961, to Lewis Balamuth and Arthur Kuris. The transducer 22, as diagrammatically shown, generally includes a driver unit made up of a generator 23 of mechanical vibrations and an acoustic impedance transformer 24. The generator 23 of mechanical vibrations may comprise a stack of laminations of magnetostrictive material, for example, nickel, and a diagrammatically illustrated winding 25 adapted to carry a biassed, high frequency alternating energizing current. The lower ends of the laminations making up the stack of generator 23 are fixedly secured, as by welding or soldering, to the upper end of the transformer 24. The transformer 24 has an enlarged section 26 intermediate its ends in the general area of a nodal plane of motion, and this section 26 constitutes a flange secured, as by bolts 27, to a casing or enclosure 28 for the generator 23 and the upper portion of the transformer 24. An inlet hose 29 and an outlet hose 30 are connected to the enclosure or casing 28 for circulating a cooling fluid, preferably water, through the enclosure, to remove heat generated in the generator 23 during operation of the device.

A biassed, high frequency alternating current is supplied to winding 25 through conductors enclosed in a flexible conduit 31 extending from a suitable oscillation generator 32, which may be of the type disclosed at page 270 of "Ultrasonic Engineering," by Alan E. Crawford, published 1955 by Butterworths Scientific Publications, London. As oscillation generator of this type is effective to supply a biassed alternating current to the winding 25 at a resonant frequency of the driver unit of transducer 22, and is further effective to vary the frequency of the supplied biassed, alternating current when the resonant frequency of the driver unit is varied due to changes in temperature, or changes in the loading thereof. Although the frequency of the supplied biassed, alternating current is adjusted, in the oscillation generator disclosed in the above identified publication, in response to a feedback signal from a capacitor type pick-up connected to the transducer, it is to be understood that other types of pick-ups may be employed, for example, a magnetostrictive pick-up 32a providing an output signal varying with the amplitude and frequency of the vibrations and being fed back to the generator 32 as well as actuating an amplitude meter 32b. Other existing types of oscillation generators may also be employed, for example, as disclosed in United States Letters Patent No. 2,872,578, in which adjustment of the frequency of the alternating current supplied by the oscillation generator is obtained through the use of a feedback signal which varies with the impedance of the transducer.

The lower or output end of transformer 24 is preferably provided with a depending threaded projection 33 which is coupled to a similar threaded projection 34 at the upper end of a vibration transmitting member 35 by means of an internally threaded coupling sleeve or nut 36. A thin disk 37 of copper or other deformable metal is preferably interposed between the smooth flat end surfaces of the projections 33 and 34 so that, when sleeve or nut 36 draws projections 33 and 34 axially toward each other, disk 37 ensures uninterrupted metallic contact between transformer 24 and vibration transmitting member 35 over the substantial cross-sectional area of projections 33 and 34, whereby the transmission of vibrations from transformer 24 to vibration transmitting member 35 is enhanced.

When transducer 22 is operated, by electrical oscillations supplied from generator 32, compressional waves are generated in the stack of laminations 23, the transformer 24 and transmission member 35, so as to cause vibrational movements in the vertical direction, that is, along the longitudinal axis of the transducer. For the purposes of the present invention, such vibrations preferably have a frequency in the range between approximately 1000 cycles per second and 100,000 cycles per second, and are of sizeable amplitude, for example, in the range between approximately .0001 and .01 inch. In order to ensure that the maximum amplitude of vibration in the vertical direction is obtained at the lower end of transmission member 35, as indicated by the double headed arrow 38, thus ensuring the maximum transmission of working energy, the overall length of the stack of magnetostrictive laminations 23 and the transformer 24, that is, the driver unit of transducer 22, and of the vibration transmission member 35 is selected so that, at the frequency of the electrical oscillations supplied to winding 25 of the transducer, a loop of longitudinal motion of the generated compressional waves occurs at or near the lower working end of transmission member 35. In other words, the overall length of the driver unit of transducer 22 and transmission member 35 is approximately equal to an integral number of one-half wavelengths of the sound waves generated in the particular materials comprising the stack of laminations 23, the transducer 24 and the transmission member 35 at the working frequency.

In FIG. 1, the above described apparatus 10 is shown employed for the purpose of inserting a rod or pin 39, which may have a circular cross-section as shown in FIG. 3, into a bore or opening 40 of similar cross-section defined in another member 41. The pin or rod 39 and bore 40 are respectively diametrically dimensioned to achieve the desired class of fit between members 39 and 41 following the insertion of member 39 in bore 40.

When using the apparatus 10 to facilitate the insertion of pin or rod 39 in bore 40 of member 41, the latter is disposed with its bore 40 extending vertically in a suitable recess 42 of the chuck or mounting fixture 12 and is clamped relative to the latter, for example, by a set screw 43, and pin 39 is arranged vertically above member 41 with the lower end of pin 39 being axially registered with the upper end of bore 40. Handles 19 are then manipulated to lower transducer 22 so that the upper end of pin 39 is received in, and hence guided by, a socket 44 (FIG. 2) provided at the lower end of transmission member 35. A downward static force F is applied to pin 39 by manipulation of handles 19 simultaneously with the operation of oscillation generator 32 so that the mechanical vibrations occurring at the lower end of transmission member 35 are transmitted to the upper end of pin 39 by direct contact under such static force.

The vibrations of transmission member 35 also actuate the pick-up 32a to produce an output signal which corresponds to the amplitude and frequency of the vibrations. The mass of pin 39, thus coupled to transmission member 35 by mere direct contact under the static force, will naturally coact with the masses of the other mechanically vibrating parts of transducer 22 and with the static loading applied through turning of handles 19 to determine the resonant frequency of the entire mechanically oscillating unit, and the oscillation generator 32 is operative to adjust the frequency of the supplied electrical oscillations in order to ensure that the latter occur at a resonance frequency of the mechanically vibrating unit. Further, it has been found that there is an optimum static force at which the amplitude of the vibrations sensed by pick-up 32a and indicated by meter 32b is at a maximum, and the handles 19 are manipulated so as to achieve this maximum vibrational amplitude. Thus, vigorous mechanical vibrations are introduced longitudinally into pin 39 and the latter is continuously fed downwardly by manipulation of handles 19 until the vibrating pin 39 has been inserted to its required depth in bore 40 of member 41. Thereafter, transmission member 35 is withdrawn upwardly from engagement with pin 39 by rotation of handles 19 in the required direction, and the operation of oscillation generator 32 is discontinued.

It has been found that vibrations transmitted to the pin 39 and having an amplitude and frequency within the ranges indicated above make it possible to insert such pin 39 in the bore 40 with the exertion of a static force which is very substantially smaller than the static force otherwise necessary to insert the pin in the bore with the desired class of fit therebetween. As represented diagrammatically on FIG. 2, the vibrational energy transmitted to pin 39 through transmission member 35 produces compressional waves within pin 39 having loops of longitudinal motion, as indicated at L, and nodes of longitudinal motion, as indicated at N. At the loops of longitudinal motion L, the surface of pin 39 is vibrating longitudinally with a substantial amplitude, and at the resonant frequency, so that very high accelerations are achieved, preferably, of the order of at least 1000 G. Such very high accelerations permit the use of a relatively small static force F, as applied through manipulation of the handles 19, to produce relatively large dynamic forces tending to urge pin 39 into the bore 40 of member 41. Further, since all so-called elastic materials can be expanded and contracted a certain definite amount without any permanent deformation of the material, a body, for example the pin 39, when made to vibrate at an appreciable amplitude and at high frequency, undergoes changes in its lineal dimensions in various directions. Thus, during each vibrational cycle, the cross-sectional dimensions of pin 39 are reduced between the loops of longitudinal motion, as indicated diagrammatically by the broken lines 45 on FIG. 2, thereby to increase the clearance between the surfaces of pin 39 and bore 40, or at least to reduce the interference therebetween in the case of a shrinkage fit, and this phenomena cooperates with the previously mentioned high accelerations that are attained to permit the use of a relatively small static force in effecting the insertion or fitting of pin 39 in bore 40.

Further, the vibratory energy applied from the outside, at a suitable frequency, to the pin 39 produces vibratory motion of the molecular structure of such pin so that the surface of pin 39 is continuously maintained in a state of motion relative to the surface of bore 40, whereby the frictional resistance to insertion of pin 39 in bore 40 is determined by the kinetic coefficient of friction therebetween, rather than by the substantially larger static coefficient of friction between the materials of pin 39 and member 41.

It is to be noted that the manner in which vibrations are transmitted to the pin or other vibrated member 39 is not critical, and may be achieved merely by contact of the transmission member 35 with the pin 39, as in the above described embodiment of the invention, and, in any case, does not require the soldering or other rigid attachment of the pin 39 to the transducer.

Although the oscillation generator 32 may be manually tuned to the resonance frequency of the mechanically vibrating unit, it is desired to employ an oscillation generator, as described above, which automatically adjusts to the resonant frequency by reason of the changes occurring in the latter as the pin 39 is driven into the bore 40. Such changes in the resonant frequency of the mechanically vibrating unit occur by reason of the fact that the natural frequency of the pin or other member 39 being inserted, and which influences the overall resonant frequency, is inversely proportional to the exposed length of the pin 39, which exposed length constantly diminishes during the insertion of pin 39 in bore 40.

Although the members 39 and 40 are represented, in the cross-sectional view of FIG. 3, as both being formed of metal, it is to be understood that the members being fitted together in accordance with the present invention may both be of a material other than metal, such as, wood, plastic, glass, ceramics or the like, or such members may be of different materials. Further, although pin 39 is shown as a solid member, and pin 39 and bore 40 are both of circular cross-section, it will be understood that pin 39 may be hollow or tubular, and that pin 39 and bore 40 may be fluted, as at 39a and 40a in FIG. 4, or may have square cross-sections, as at 39b and 40b on FIG. 5.

It is also to be noted that the invention is not restricted to the insertion of a member into a recess, bore or opening defined by only a single other member. Thus, as shown in FIG. 6, the vibrated member 39c may be in the form of a key which is to be inserted in a keyway 40c defined by cooperating axial slots formed in the confronting surfaces of a shaft 41′ and a hub or collar 41″.

Although the pin 39 in FIGS. 1 and 2 has a substantial cross-sectional area in relation to its length, and thus can resist buckling by an axially applied static force, even if the latter is of large magnitude, the present invention, which permits substantial reduction of the axially applied static force will be particularly useful in connection with the insertion of a long, slender member, for example, a wire or the like, into a long tube or conduit, in which case the long, slender member cannot resist a large axial force without buckling.

Referring again to FIG. 1, it will be seen that the transmission member 35, as there illustrated, is composed of two generally cylindrical sections 46 and 47 of relatively large and small masses, respectively, and which merge through a curved portion. Since the two sections 46 and 47 have equal and opposite momenta, the average particle velocity of the section 47 of smaller mass is higher than that of the section 46 of larger mass, so that magnification of particle movement is obtained when the section 47 of smaller mass is at the output of transmission member 35, as illustrated. Thus, the amplitude of vibrations transmitted from transmission member 35 to pin 39 is larger than the amplitude of the vibrations received by member 35 from transducer 22.

Referring now to FIG. 8, the curve 48 thereon indicates the relationship between the amplitude A of the vibrations applied to the pin or other member 39 and the static force $F_d$ which, when applied to such member, is effective to completely damp the vibrations. It will be seen that, as the amplitude A of the vibrations increases, the static force $F_d$ that will completely damp the vibrations is decreased. Thus, when fitting together members in accordance with the present invention, the amplitude of the applied vibrations should be selected so as to have a magnitude less than that at which the static force F that needs to be applied would cause substantial damping of the vibrations.

The amplitude of the vibrations transmitted to the pin or other member 39 by transmission member 35 may be suitably varied by changing the proportion of the masses of the sections 46 and 47 of the transmission member 35, or even by providing a transmission member 35a (FIG. 7) with an input section 46a having a smaller mass than that of the output section 47a so that the amplitude of the vibrations transmitted to the pin or other member 39 is smaller than the amplitude of the vibrations received by transmission member 35a from transducer 22.

In the above described embodiments of the invention, the insertion of the pin or other member 39 into the recess, bore, or other space defined by at least one other member 41 has been facilitated by the application of vibratory energy to the member 39 in the direction of such insertion, that is, longitudinally with respect to the member 39. However, in accordance with this invention, the vibrations may be applied to the member 41 rather than to the member 39, or vibrations may be simultaneously applied to both members 39 and 41, in order to facilitate the fitting together thereof. When vibrated member 41 is of annular configuration, the vibrations of high frequency and significant amplitude are preferably applied radially thereto so that, during each vibrational cycle, the cross-section of bore 40 is expanded and contracted. It will be apparent that, when the cross-section of bore 40 is expanded, the clearance between the surfaces of pin 39 and member 41 is increased, or at least the interference between such surfaces is decreased for facilitating the insertion of pin 39 in bore 40.

Figure 9:
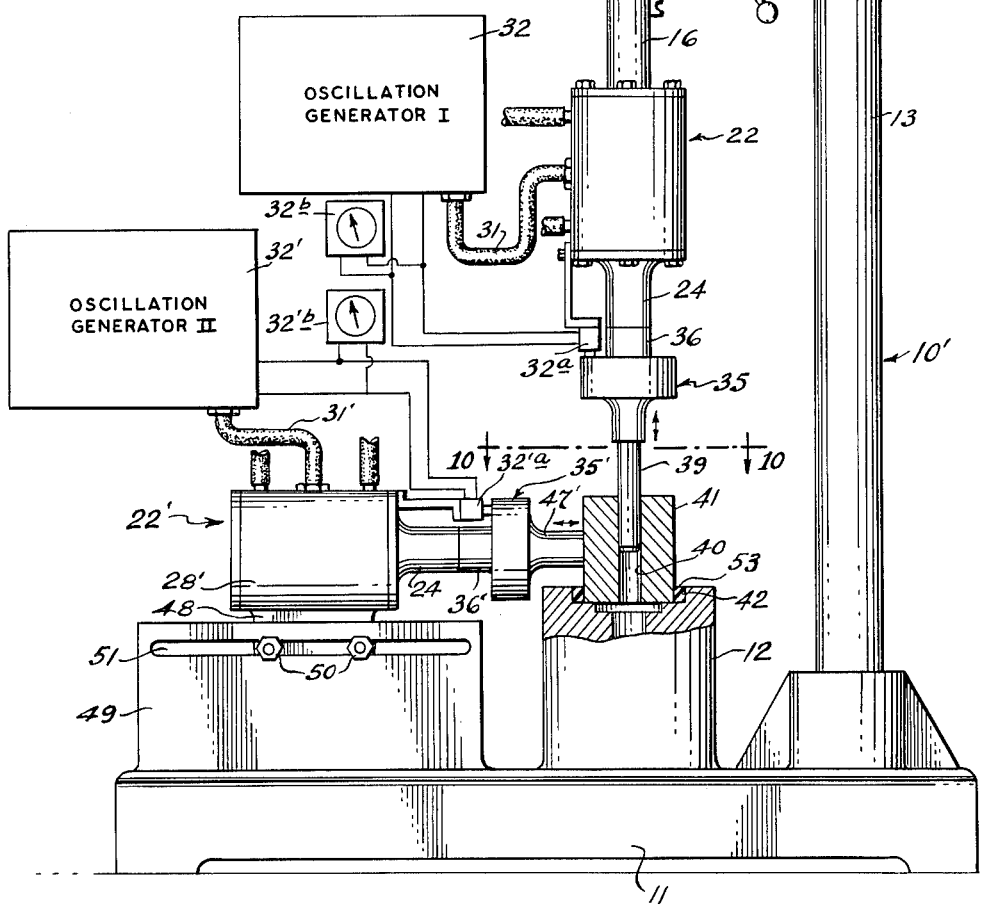
FIG. 9 is a view similar to that of FIG. 1, but showing another apparatus for fitting together members in accordance with this invention.

Referring now to FIG. 9, it will be seen that the apparatus 10' there illustrated for inserting the pin 39 axially into the bore 40 of the member 41 includes all of the parts or components making up the apparatus 10 previously described in detail herein with reference to FIG. 1, and that such parts are identified by the same reference numerals in FIG. 9 as in FIG. 1. Further, the apparatus 10' includes a horizontally acting transducer 22' similar to the transducer 22 and disposed in front of mounting fixture 12, and which includes a rearwardly extending acoustic impedance transformer 24' coupled, as by a sleeve or nut 36', to a vibration transmitting member 35'. The enclosure or casing 28' of transducer 22' may have a mounting bracket 48 extending downwardly therefrom between upstanding support members 49 provided on the front portion of base 11, and being adjustably secured to the support members 49, as by bolts 50 received in slots 51 of the support members. It will be apparent that, after the member 41 has been disposed in the mounting fixture 12 on base 11, transducer 22' can be adjustably positioned so as to contact the output section 47' of its vibration transmitting member 35' with the peripheral surface of member 41. When transducer 22' is thus positioned, the longitudinal axis of its mechanical vibrating unit extends radially with respect to the annular member 41 to introduce high frequency vibratory energy radially into the latter upon energization of transducer 22' with electrical oscillations supplied through a cable or conduit 31' from an oscillation generator 32' which is controlled by feed back from a pick-up 32'a which also actuates an amplitude meter 32'b.

Figure 10:
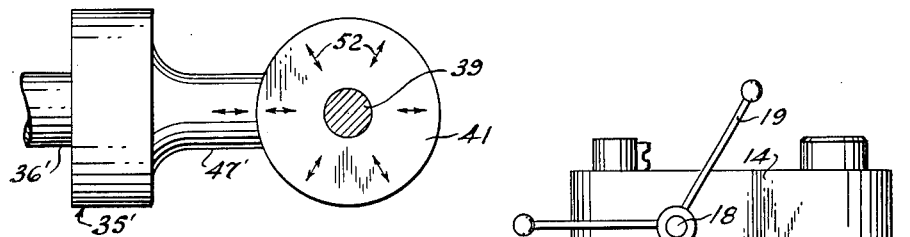
FIG. 10 is a sectional view taken along the line 10—10 on FIG. 9, but on a larger scale.

As represented by the arrows 52 on FIG. 10, the radially introduced vibrations cause radial elastic vibrations of the member 41 to increase the diametrical dimensions of its bore 40 during each vibrational cycle. In the case of the apparatus 10', in which the transducer 22 simultaneously introduces longitudinal vibrations in the inserted member 39, it will be apparent that the radial vibrations of the member 41 produced by the transducer 22' cooperate with the longitudinal compressional waves generated in the pin or member 39 to further facilitate the insertion of the latter in bore 40. However, if desired, the transducer 22 may be eliminated from the apparatus 10', so that the vertically movable rod 16 then acts directly on the upper end of pin 39, in which case the static force that needs to be exerted downwardly by rod 16 on pin 39 to effect the insertion of the latter in bore 40 is reduced only by the action of the radial vibrations produced in member 41 by transducer 22'. The use of an apparatus in which only the member 41 is radially vibrated may be dictated by the relative dimensions of the members which are to be fitted together. For example, in the case of an elongated shaft which is to be inserted in the bore or central opening of a collar or ring having a relatively small axial dimension, the post 13 would need to be excessively tall in order to accommodate the long shaft between the transducer 22 and the collar or ring carried by the mounting fixture 12.

When the member 41 is radially vibrated, as in the apparatus 10' of FIG. 9, the mounting fixture 12 supporting the member 41 should be designed to avoid damping of the radial vibrations of the latter, for example, by surrounding the member 41 with a rubber ring 53 within the recess or seat 42 of the mounting fixture.

Although illustrative embodiments of the invention have been described in detail herein with reference to the accompanying drawings, it is to be noted that the invention is not limited to those precise embodiments, and that various changes and modifications may be effected therein by one skilled in the art without departing from the scope or spirit of the invention, except as defined in the appended claims.

What is claimed is:

1. A method of effecting the insertion of one member into a corresponding opening defined by at least one other member, which opening is dimensioned relative to the cross-section of said one member so as to normally interpose substantial frictional resistance to relative movement of said one member in the opening, comprising exerting a force urging said members to move relative to each other in the direction of said insertion, and simultaneously applying vibratory energy in said direction to the member being inserted so as to effect elastic vibration thereof at a frequency of at least 1000 cycles per second with peak accelerations of the order of at least 1000 G, whereby the frictional resistance to said insertion is qualitatively reduced so that said force may be of a relatively small magnitude to effect the insertion.

2. A method of effecting the insertion of an elongated member into an opening of similar cross-section defined by another member, which opening is dimensioned relative to the cross-section of said elongated member so as to normally interpose substantial frictional resistance to relative movement of said elongated member in said opening, comprising exerting a static force on said members in the direction of said insertion, and simultaneously applying vibratory energy to said elongated member in the direction of the longitudinal axis of the latter so as to effect longitudinal elastic vibration thereof at a frequency of at least 1000 cycles per second with peak accelerations of the order of at least 1000 G, whereby the cross-sectional area of said elongated member is reduced at each node of the longitudinal vibration during each cycle of vibration to decrease the resistance to insertion of said elongated member in said opening so that said static force may be of a relatively small magnitude to effect the insertion of said elongated member in said opening.

3. A method of fitting a first member of circular cross-section in a correspondingly shaped opening of an annular second member, which opening is diametrically dimensioned relative to the diameter of said cross-section of said first member so as to normally interpose substantial frictional resistance to relative movement of said first member in said opening of the second member, comprising exerting a static force on said members tending to urge said first member into said opening of the second member, and simultaneously applying vibratory energy to said first member in the same direction as said static force and radially to said second member, respectively, to effect elastic vibrations of both of said members at frequencies of at least 1000 cycles per second with peak accelerations of the order of at least 1000 G, whereby said opening is expanded during each vibrational cycle to reduce the resistance to insertion of said first member in said opening so that said static force may be of relatively small magnitude to effect the insertion of said first member in said opening.

4. A method of effecting the insertion of one member into a corresponding opening defined by at least another member, which opening is dimensioned relative to the cross-section of said one member so as to normally interpose substantial frictional resistance to relative movement of said one member in the opening, comprising aligning said one member with said opening, and pressing an electro-mechanical generator of mechanical vibrations against said one member in the direction toward said opening so as to produce compressional waves in said one member at a frequency of at least 1000 cycles per second and with peak accelerations of the order of at least 1000 G, while simultaneously urging said one member into said opening with a static force which results in a maximum amplitude of said waves, whereby the frictional resistance to insertion of said one member into said opening is qualitatively reduced.

References Cited by the Examiner
UNITED STATES PATENTS

| | | |
|---|---|---|
| 2,939,250 | 6/1960 | Kline. |
| 3,016,604 | 1/1962 | Castelvecchi _____ 29—255 |
| 3,145,467 | 8/1964 | Bodine _____ 29—525 |

WHITMOMRE A. WILTZ, *Primary Examiner.*